United States Patent
Kanai

(10) Patent No.: US 10,414,170 B2
(45) Date of Patent: Sep. 17, 2019

(54) BRAILLE BODY, INKJET PRINTER, AND BRAILLE BODY FORMING METHOD

(71) Applicant: MIMAKI ENGINEERING CO., LTD., Nagano (JP)

(72) Inventor: Yuta Kanai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/114,263

(22) Filed: Aug. 28, 2018

(65) Prior Publication Data

US 2019/0061374 A1 Feb. 28, 2019

(30) Foreign Application Priority Data

Aug. 29, 2017 (JP) .................................. 2017-164803

(51) Int. Cl.

| | |
|---|---|
| *B41J 3/32* | (2006.01) |
| *B41M 3/16* | (2006.01) |
| *G09B 21/02* | (2006.01) |
| *B41J 11/00* | (2006.01) |
| *G09B 21/00* | (2006.01) |
| *B41M 7/00* | (2006.01) |
| *B41J 2/045* | (2006.01) |

(52) U.S. Cl.
CPC ............... *B41J 3/32* (2013.01); *B41J 11/002* (2013.01); *B41M 3/16* (2013.01); *G09B 21/003* (2013.01); *G09B 21/02* (2013.01); *B41J 2/04581* (2013.01); *B41M 7/0081* (2013.01)

(58) Field of Classification Search
CPC ........ B41J 2/04581; B41J 3/32; B41J 11/002; B41M 3/16; B41M 7/0081; G09B 21/02; G09B 21/003
See application file for complete search history.

(56) References Cited

U.S. PATENT DOCUMENTS

| | | | | |
|---|---|---|---|---|
| 4,650,421 A | * | 3/1987 | Anczurowski | ....... G09B 21/003 430/124.13 |
| 6,164,850 A | * | 12/2000 | Speakman | ................. B41J 2/01 400/120.09 |
| 7,416,764 B2 | * | 8/2008 | Matsumoto | ............ B42D 25/29 427/407.1 |

FOREIGN PATENT DOCUMENTS

JP    H05330151    12/1993

* cited by examiner

*Primary Examiner* — Anh T Vo
(74) *Attorney, Agent, or Firm* — JCIPRNET

(57) ABSTRACT

When forming a gloss layer, an UV curable ink in a semi-cured state is cured when spread more than when forming matte layers, whereby a surface smoothness of the gloss layer becomes higher than the matte layers, and on the other hand, the matte layers can be formed thick. Therefore, a braille body having the necessary height and the smooth tactual sense while having a layered structure can be formed.

9 Claims, 7 Drawing Sheets

BRAILLE BODY, INKJET PRINTER, AND BRAILLE BODY FORMING METHOD

CROSS REFERENCE TO RELATED APPLICATIONS

This application claims the priority benefit of Japanese Patent Application No. 2017-164803, filed on Aug. 29, 2017. The entirety of the above-mentioned patent application is hereby incorporated by reference herein and made a part of this specification.

TECHNICAL FIELD

The present disclosure relates to a braille body, an inkjet printer, and a braille body forming method.

DESCRIPTION OF THE BACKGROUND ART

Various techniques have been conventionally developed as a technique for forming a braille body (protrusion forming a "point" of a braille) configuring the braille. For example, Japanese Unexamined Patent Publication No. 5-330151 discloses a technique of forming the braille body through an inkjet method. In the technique described in Japanese Unexamined Patent Publication No. 5-330151, ejection of an ink (thermosetting ink, etc.) through the inkjet method and curing of the ink are carried out over plural times to layer a plurality of layers, thus forming a braille body with the plurality of layers.

SUMMARY

In the technique disclosed in Japanese Unexamined Patent Publication No. 5-330151, the number of layers is preferably as small as possible to reduce the number of processes for forming the braille body, but each layer is to be made as thick as possible, as a height of a certain extent is required for the braille body. In order to thicken each layer, the ink may be cured immediately after being ejected, that is, the ink may be immediately cured after landing on a base material for arranging the braille body. Thus, the ejected ink (ink landed on the base material for arranging the braille body) is cured before spreading, whereby the layer can be thickened. However, if the ink is cured before the ink spreads, the relevant layer becomes a matte layer having low surface smoothness, and hence the tactual sense of the braille body becomes poor.

The present disclosure is provided based on such background, and provides a braille body having a necessary height and a smooth tactual sense while having a layered structure, an inkjet printer capable of forming the braille body having the necessary height and the smooth tactual sense while having the layered structure, and a braille body forming method.

A braille body according to a first aspect of the present disclosure includes a plurality of layers that are laminated, in which the plurality of layers are formed with an electromagnetic wave curable ink, a thermosetting ink, or a thermoplastic ink; among the plurality of layers, one or more layers other than an uppermost layer touched by a human are a matte layer, and at least the uppermost layer is a gloss layer having a higher surface smoothness than the matte layer.

According to the configuration described above, a smooth tactual sense of the braille body can be obtained by forming the uppermost layer as the gloss layer having a high surface smooth while obtaining the height of the braille body with one or more matte layers, compared to the case of forming the uppermost layer as the matte layer. Therefore, according to the configuration described above, a braille body having the necessary height and the smooth tactual sense while having a layered structure can be obtained.

A primer layer disposed between the plurality of layers and a base material to fix the plurality of layers to the base material may be further provided.

According to the configuration described above, the braille body can be strongly fixed to the base material by the primer layer.

The plurality of layers may include a first layer, and a second layer, which is a layer located lower than the first layer, the first layer may cover the second layer, and at least one part of a peripheral edge of the first layer may be attached to the primer layer.

According to the configuration described above, the braille body can be more strongly fixed to the base material compared to the case of attaching only the lowermost layer of the plurality of layers to the primer layer.

In the plurality of layers, an area in plan view may become larger toward a layer located higher, each upper layer covering a lower layer below, the primer layer may have a larger area in plan view than each of the lower layers, and a peripheral edge of each upper layer may be attached to an upper surface of the primer layer.

According to the configuration described above, the braille body can be formed to have a preferred shape, and the braille body can be more strongly fixed to the base material.

The plurality of layers may be formed by an inkjet type printing.

The plurality of layers thus can be easily formed.

An inkjet printer according to a second aspect of the present disclosure relates to an inkjet printer for forming a braille body including a plurality of layers, the inkjet printer including a print head that ejects an ink, wherein the ink is an electromagnetic wave curable ink, a thermosetting ink, or a thermoplastic ink; a curing unit that cures the ink ejected from the print head; and a controller that drives the print head and the curing unit, in which the controller carries out a first process of driving the print head to eject the ink, and driving the curing unit to cure the ink ejected from the print head, and a second process of driving the print head to eject the ink, and driving the curing unit to cure the ink ejected from the print head in a state where a surface smoothness of the ink is higher than in the curing of the first process, and among the plurality of layers, one or more layers other than an uppermost layer touched by a human are formed through the first process, and at least the uppermost layer is formed through the second process.

According to the configuration described above, the surface smoothness of the uppermost layer can be lowered and a smooth tactual sense of the braille body can be obtained by forming the uppermost layer through the second process while obtaining the height of the braille body with the layers formed through the first process. Therefore, according to the configuration described above, a braille body having the necessary height and the smooth tactual sense while having a layered structure can be obtained.

A primer layer forming portion that forms a primer layer on a base material, the primer layer for fixing the plurality of layers to the base material may be further provided, in which the controller may further carry out a third process of driving the primer layer forming portion to form the primer layer, the first process and the second process may be carried out after the third process so that an area in plan view becomes larger toward a layer located higher in the plurality of layers, and each upper layer covers a lower layer below, the primer layer may have a larger area in plan view than each of the lower layers; and a peripheral edge of each upper layer in the plurality of layers may be attached to an upper surface of the primer layer.

According to the configuration described above, the braille body can be formed to have a preferred shape, and the braille body can be more strongly fixed to the base material.

A braille body forming method according to a third aspect of the present disclosure relates to a braille body forming method of forming a braille body including a plurality of layers on a base material, the braille body forming method including the steps of carrying out a first process of ejecting an ink through an inkjet method, and curing the ejected ink, wherein the ink is an electromagnetic wave curable ink, a thermosetting ink, or a thermoplastic ink, and a second process of ejecting the ink through the inkjet method, and curing the ejected ink in a state where a surface smoothness of the ink is higher than in the curing of the first process, and among the plurality of layers, one or more layers other than an uppermost layer touched by a human are formed through the first process, and at least the uppermost layer is formed through the second process.

According to the configuration described above, the surface smoothness of the uppermost layer can be lowered and a smooth tactual sense of the braille body can be obtained by forming the uppermost layer through the second process while obtaining the height of the braille body with the layers formed through the first process. Therefore, according to the configuration described above, a braille body having the necessary height and the smooth tactual sense while having a layered structure can be obtained.

A third process of forming a primer layer on a base material, the primer layer for fixing the plurality of layers to the base material may be carried out before the first process and the second process, in which the first process and the second process are carried out so that an area in plan view becomes larger toward a layer located higher in the plurality of layers, and each upper layer covers a lower layer below, the primer layer may have a larger area in plan view than each of the lower layers; and a peripheral edge of each upper layer in the plurality of layers may be attached to an upper surface of the primer layer.

According to the configuration described above, the braille body can be formed to have a preferred shape, and the braille body can be more strongly fixed to the base material.

According to the present disclosure, a braille body having a necessary height and a smooth tactual sense while having a layered structure, an inkjet printer capable of forming the braille body having the necessary height and the smooth tactual sense while having the layered structure, and a braille body forming method can be provided.

BRIEF DESCRIPTION OF THE DRAWINGS (A) of FIG. 1 is a plan view of a braille body according to one embodiment of the present disclosure; (B) of FIG. 1 is a cross-sectional view taken along a line A-A of the braille body of (A) of FIG. 1;

FIG. 4A shows ejection of UV curable ink L and irradiation of ultraviolet light U1 (curing immediately), and FIG. 4B shows completion of matte layer 12a;

FIG. 5A shows ejection of UV curable ink L and irradiation of ultraviolet light U1 (curing immediately), FIG. 5B shows completion of matte layer 12b;

Figure 6A:
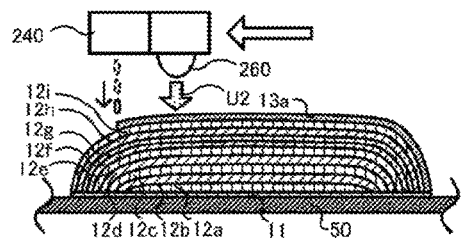
Figure 6D:
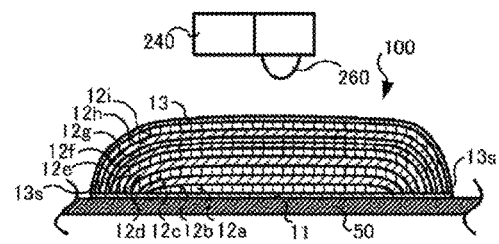
Figure 6B:
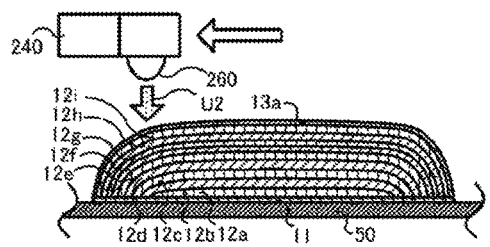
Figure 6C:
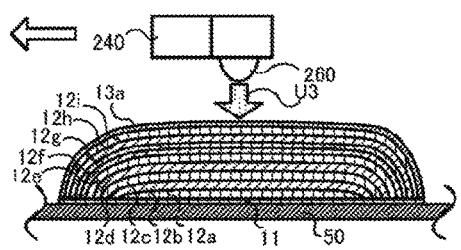
Figure 7:
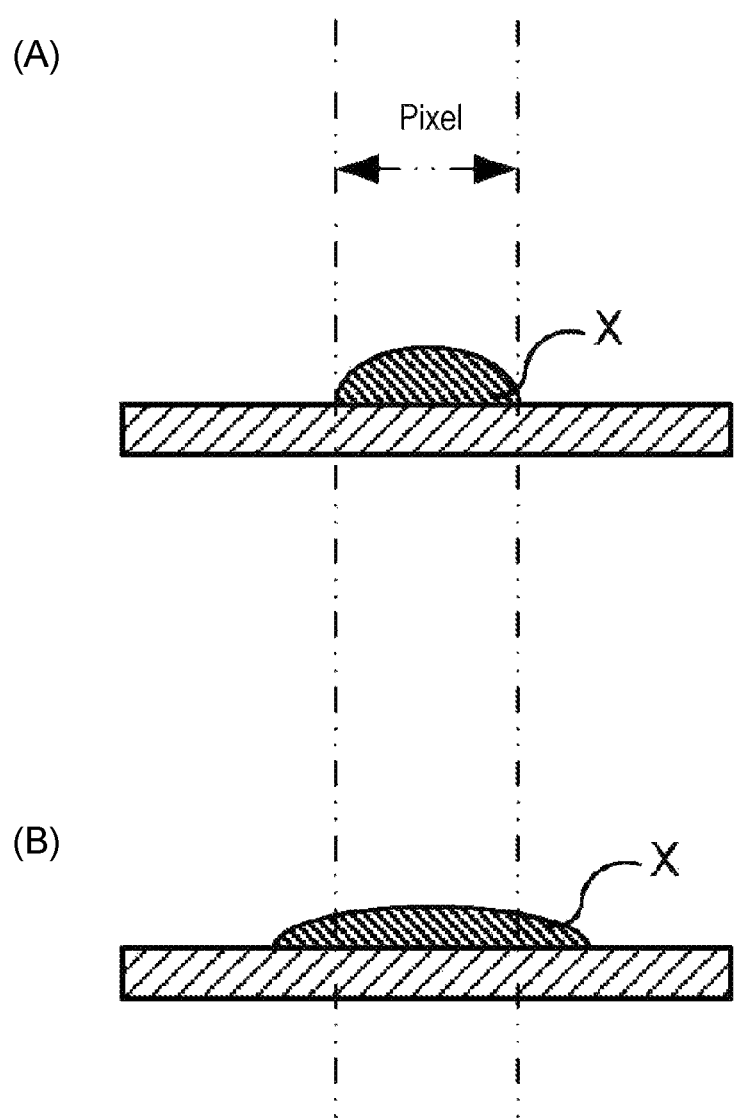

FIG. 6A through FIG. 6D illustrate a process diagram showing a process of forming a gloss layer, FIG. 6A shows ejection of UV curable ink L and irradiation of ultraviolet light U2 (semi-curing UV curable ink L), FIG. 6B shows continue irradiation of ultraviolet light U2 (semi-curing UV curable ink L), FIG. 6C shows irradiation of ultraviolet light U3 (curing UV curable ink L), FIG. 6D shows completion of gloss layer 13;

(A) of FIG. 7 is a cross-sectional view of an UV curable ink immediately after being ejected from a print head, and landing on the surface to be ejected; and (B) of FIG. 7 is a cross-sectional view of the UV curable ink after elapse of a time from the state of (A) of FIG. 7.

DETAILED DESCRIPTION OF EMBODIMENTS

Hereinafter, a braille body 100, an inkjet printer 200, and a method for forming the braille body 100 according to one embodiment of the present disclosure will be described with reference to the drawings. The braille body 100 is a protrusion called a "point" that configures a braille. The braille is expressed by an array of braille bodies 100.

Configuration of Braille Body 100

Figure 1:
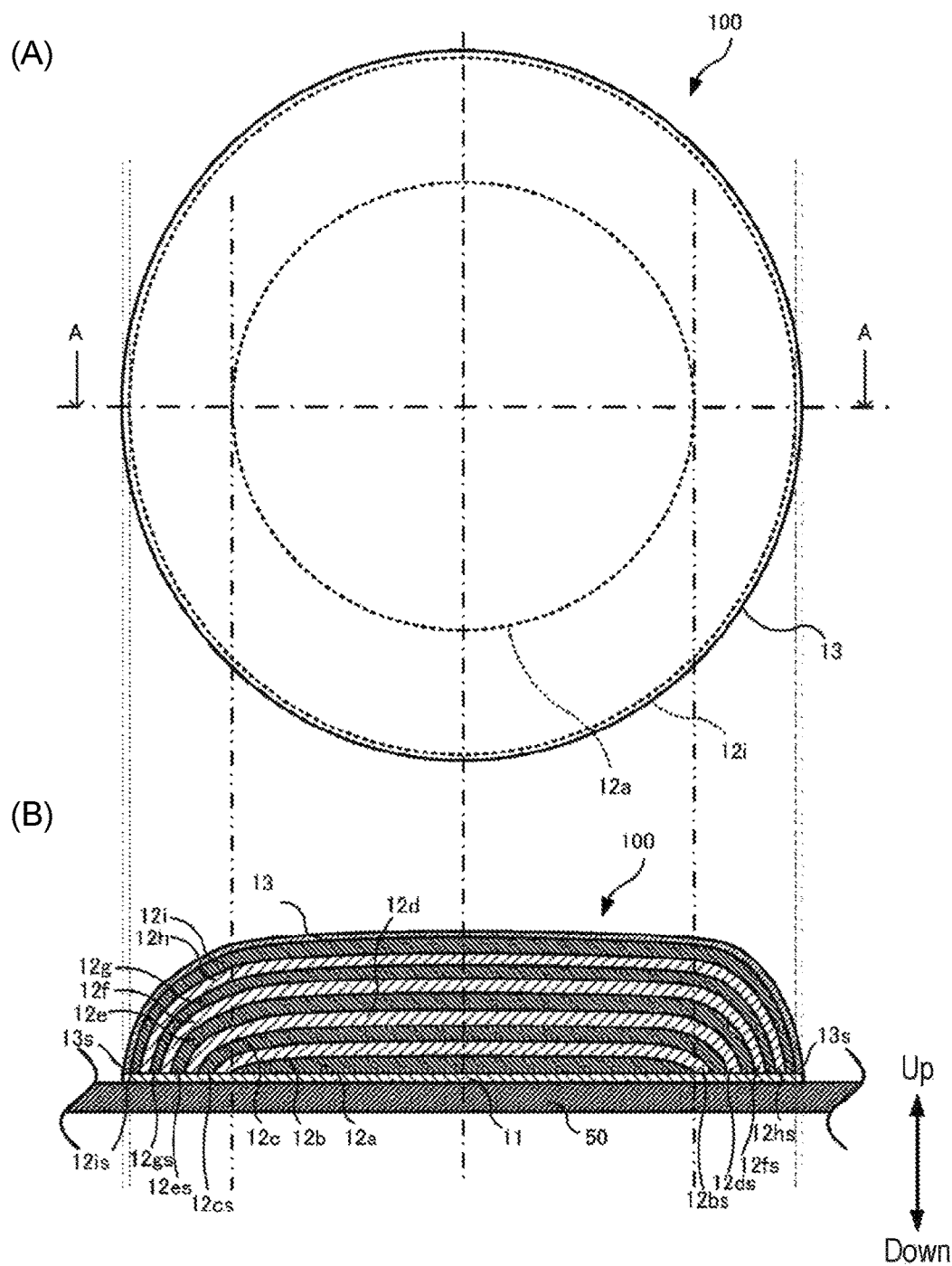

As shown in FIG. 1, the braille body 100 is formed on a base material 50 made of metal or synthetic resin, and includes a primer layer 11, a plurality of matte layers 12a to 12i, and a gloss layer 13. Each layer is concentrically formed in plan view (when seen from above).

The primer layer 11 is directly formed on a main surface of the base material 50. The primer layer 11 is formed by a primer ink having adhesiveness. Therefore, the primer layer 11 is an adhesive layer having adhesiveness, and is provided to fix the matte layers 12a to 12i and the gloss layer 13 to the base material 50.

The matte layers 12a to 12i and the gloss layer 13 are formed on the primer layer 11. Each layer is layered from the bottom (base material 50 side) to the top in the order of the matte layer 12a, matte layer 12b, ... matte layer 12h, matte layer 12i, and the gloss layer 13. The gloss layer 13 is an uppermost layer of each layer of the matte layers 12a to 12i and the gloss layer 13, and is a layer touched by a person whorl reads the braille. Each layer of the matte layers 12a to 12i and the gloss layer 13 is formed with the same UV (Ultra Violet) curable ink (ink containing UV curable resin). The UV curable ink is an ink that cures by an ultraviolet light, and an arbitrary type is used. Each layer is formed by applying and curing the UV curable ink, but the conditions of the curing differ between the matte layers 12a to 12i and the gloss layer 13 (to be specifically described layer). Thus, the matte layers 12a to 12i and the gloss layer 13 have different properties. Specifically, the surface smoothness of the gloss layer 13 is high. In particular, the surface smoothness of the gloss layer 13 is higher than the surface smoothness of each of the matte layers 12a to 12i. In other words, the surface roughness of the gloss layer 13 is lower than the surface roughness of each of the matte layers 12a to 12i. Thus, the surface (surface on upper side) of the gloss layer 13 is smoother. The thickness (length in the up and down direction) of each layer of the matte layers 12a to 12i is thick (in particular, thicker than the gloss layer 13). When the layer has irregularities, the thickness of the layer merely needs to be a thickness of the evened irregularities or a thickness of the thickest portion. Each layer of the matte layers 12a to 12i and the gloss layer 13 is attached to the adjacent layer by the curing of the UV curable ink.

The plurality of layers including the matte layers 12a to 12i and the gloss layer 13 are concentrically formed. Furthermore, in the plurality of layers, an area (in particular, area seen in plan view, the same is applied hereinafter) becomes larger toward the upper layer (see also FIG. 3). Therefore, each upper layer covers the lower layer located below that upper layer (covers the entire lower layer). For example, the upper matte layer 12b covers the lower matte layer 12a. For example, the upper gloss layer 13 covers the lower matte layer 12i (and lower layers). As the upper layer covers the lower layer, the upper layer includes a portion (horizontal portion) that covers the upper surface of the lower layer, and a portion (inclined portion inclined with respect to a horizontal plane) that covers an inclined surface of a portion on the outer side of the lower layer. According to such structure, each of the matte layers 12b to 12i and the gloss layer 13 other than the lowermost layer includes peripheral edges 12bs to 12is, and 13s (edge of the inclined portion, portion running out from the lower layer in plan view) reaching the primer layer 11 and attached to the primer layer 11. The matte layer 12a, which is the lowermost layer, has the lower surface entirely attached to the primer layer 11.

The shape of the gloss layer 13 seen in plan view is the same as the primer layer 11, and the gloss layer 13 does not run out from the primer layer 11 when the gloss layer 13 and the primer layer 11 are seen in plan view. The area of the primer layer 11 is larger than the area of each layer of the matte layers 12a to 12i.

Configuration of Inkjet Printer 200

Figure 2:
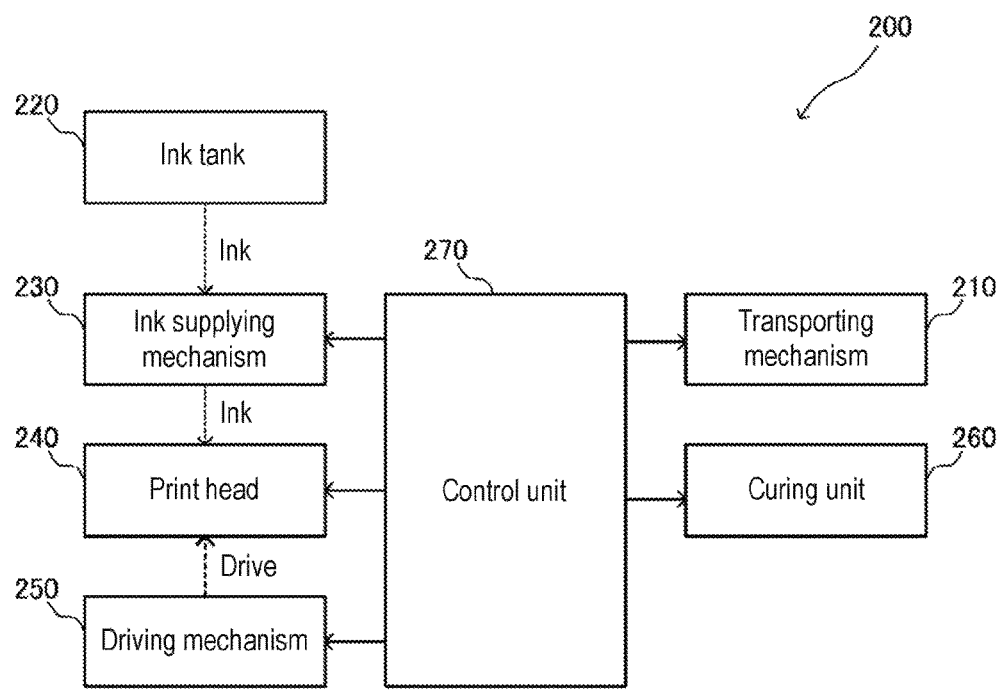
FIG. 2 is a configuration view of an inkjet printer according to one embodiment of the present disclosure.

As shown in FIG. 2, the inkjet printer 200 includes a transporting mechanism 210, an ink tank 220, an ink supplying mechanism 230, a print head 240, a driving mechanism 250, a curing unit 260, and a control unit (controller) 270.

The transporting mechanism 210 transports the base material 50. The transporting mechanism 210 is configured by a belt conveyor. The transporting mechanism 210 may include a table on which the base material 50 is placed and a driving mechanism that drives the table.

The ink tank 220 individually stores a primer ink to become the material of the primer layer 11 and an UV curable ink to become the material of each layer of the matte layers 12a to 12i and the gloss layer 13. The ink tank 220 is attached to the inkjet printer 200 as a cartridge type.

The ink supplying mechanism 230 is a mechanism that individually supplies the primer ink and the UV curable ink in the ink tank 220 to the print head 240. The ink supplying mechanism 230 includes, for each of the UV curable ink and the primer ink, a sub-tank that stores the ink, a supplying tube that supplies the ink in the ink tank 220 to the sub-tank, a circulating tube that forms a circulating path for circulating the ink stored in the sub-tank through the print head 240, a valve that controls the circulation of the ink in the circulating path, and a driving device that drives the valve.

The print head 240 individually ejects the primer ink and the UV curable ink supplied from the ink supplying mechanism 230 to the base material 50 through the inkjet method. The print head 240 includes, for each of the primer ink and the UV curable ink, a storage chamber that stores the ink circulating through the circulating path of the ink supplying mechanism 230, a piezoelectric element or a heater that pushes out the ink stored in the storage chamber, and a nozzle that ejects the pushed-out ink. With respect to each of the primer ink and the UV curable ink, a plurality of sets of storage chamber, the piezoelectric element or heater, and the nozzle are arranged in a line along a main scanning direction, to be described later. Thus, the ink can be simultaneously ejected with respect to a plurality of pixels arranged along the main scanning direction.

The driving mechanism 250 moves the print head 240 in a direction orthogonal to the transporting direction (main scanning direction) of the base material 50. The driving mechanism 250 includes a carriage for mounting the print head 240, and a moving mechanism that moves the carriage in a sub-scanning direction orthogonal to the main scanning direction. The moving mechanism is configured to include a guide rail that supports the carriage so as to be movable in the sub-scanning direction, and a towing rope that tows the carriage and a winding mechanism that winds the towing rope (one set is disposed at each end of the guide rail).

The curing unit 260 is configured to include an UV lamp that emits the ultraviolet light for curing the UV curable ink ejected onto the base material 50. The curing unit 260 is, for example, mounted on the carriage of the driving mechanism 250, and is moved with the print head 240 (see also FIG. 4A and FIG. 4B, etc.)

The control unit 270 controls the transporting mechanism 210 (e.g., the belt conveyor or driving mechanism), the ink supplying mechanism 230 (e.g., the driving device), the print head 240 (e.g., the piezoelectric element or heater), the driving mechanism 250 (e.g., the winding mechanism), and the curing unit 260, and carries out a braille body forming process of forming the braille body 100 on the base material 50.

To carry out the braille body forming process, the control unit 270 is configured to include a storage device (hard disc, flash memory, etc.) that stores programs and various types of data, a processor (Central Processing Unit (CPU), etc.) that executes the program stored in the storage device and uses the various types of data to actually execute the printing process, a main memory of the processor, and various types of interfaces. The control unit 270 is, for example, a personal computer.

Method for Forming Braille Body 100 or Braille Body Forming Process

The braille body 100 is formed through a braille body forming process executed by the control unit 270. The braille body forming process will be described below. The braille body forming process is actually a process of forming a plurality of braille bodies 100 to express a braille, but will be described here as a process of forming one braille body 100. When forming the plurality of braille bodies 100, image data, to be described later, may be prepared for each braille body 100, or the shape and position of each layer of each braille body 100 may be represented with one piece of image data.

Figure 3:
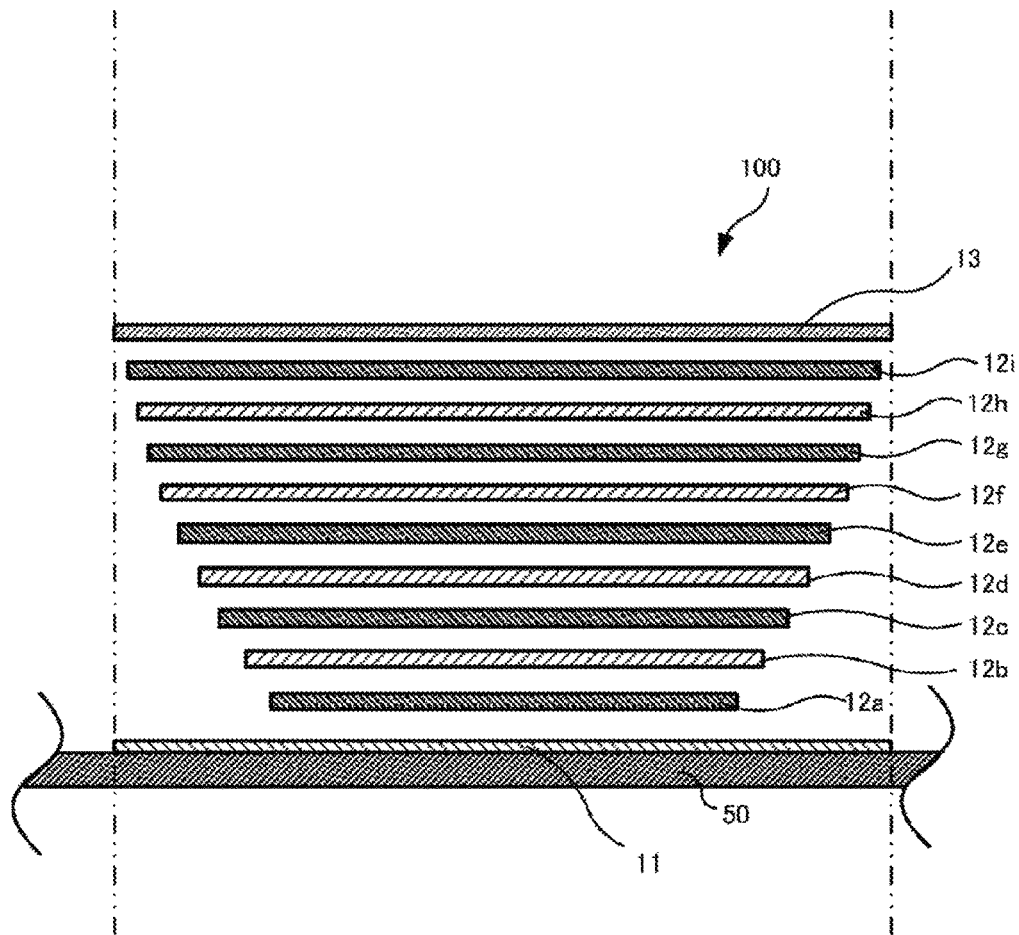
FIG. 3 is a conceptual view showing an area (area on image data) of an ejection region of an ink for forming a primer layer, a plurality of matte layers, and a gloss layer configuring a braille body according to one embodiment of the present disclosure.

The braille body forming process is started with the provision of the image data for forming the braille body 100 from an external host computer, and the like as a trigger. The image data is data representing the shape and position of each layer by specifying ejection/non-ejection of each of the primer ink and the UV curable ink for every pixel with respect to each layer (each layer of primer layer 11, matte layers 12a to 12i, gloss layer 13) configuring the braille body 100. The ejection amount of the ink per pixel (per unit area) is common to each layer. In the image data, each layer has a circular shape by a plurality of pixels, and has the respective center coinciding. The primer layer 11, the matte layers 12a to 12i, and the gloss layer 13, that is, each layer is a concentric circle. Each layer that is actually formed is also formed concentrically in plan view. Each area of each layer of the matte layers 12a to 12i and the gloss layer 13 becomes larger toward the upper layer, as shown in FIG. 3. Furthermore, the primer layer 11 and the gloss layer 13 are represented to have the same shape so as to coincide in the image data.

In the braille body forming process, the control unit 270 first controls the transporting mechanism 210 to move the base material 50 to a print start position. Thereafter, the control unit 270 carries out a process for actually forming the braille body 100. Specifically, the control unit 270 controls (drives) the transporting mechanism 210, the ink supplying mechanism 230, the print head 240, the driving mechanism 250, and the curing unit 260 to sequentially form the primer layer 11, the matte layer 12a, the matte layer 12b, the matte layer 12c, the matte layer 12d, the matte layer 12e, the matte layer 12f, the matte layer 12g, the matte layer 12h, the matte layer 12i, and the gloss layer 13 on the base material 50 (sequentially formed from the lower layer).

When forming the primer layer 11, the control unit 270 controls the transporting mechanism 210 and the driving mechanism 250, and relatively moves the print head 240 in the sub-scanning direction and the main scanning direction with respect to the base material 50. During the movement, the control unit 270 controls the print head 240 to eject the primer ink from the nozzle at the timing when the nozzle of the print head 240 reaches the position of the pixel (specified by the image data) for ejecting the primer ink. The primer ink is thereby applied on the base material 50 so as to form a circular coating film, and the applied primer ink is fixed, thus forming the circular primer layer 11. The portion to eject the primer ink of the print head 240 is a primer layer forming portion (driven by the control unit 270) for forming the primer layer 11 under the control of the control unit 270. Upon fixing, processes such as heating and drying may be carried out. In this case, the inkjet printer 200 includes a fixing unit controlled by the control unit 270 to carry out a process of fixing the primer ink, and fixes the primer ink with the fixing unit. In this case, the primer layer forming portion may be configured including the fixing unit. The primer layer 11 may be formed through other methods (e.g., screen printing, etc.) other than the inkjet method. The primer layer forming portion merely needs to be formed by a suitable device for forming the primer layer 11.

Figure 4A:
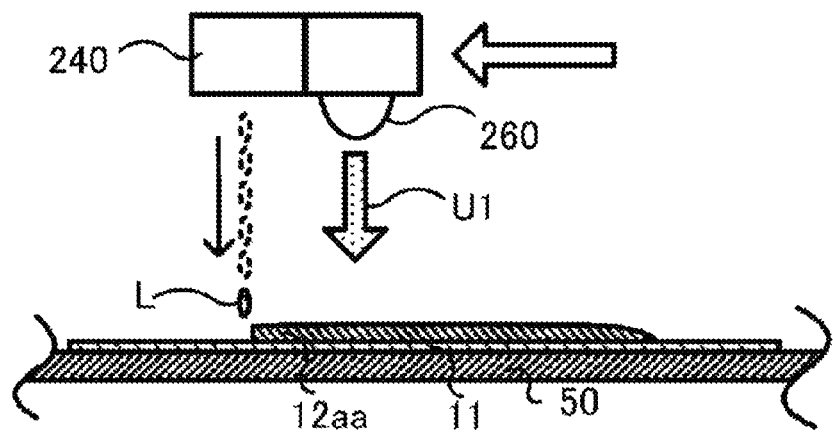
FIG. 4A and FIG. 4B illustrate a process diagram showing a process of forming a matte layer of a lowermost layer.
Figure 4B:
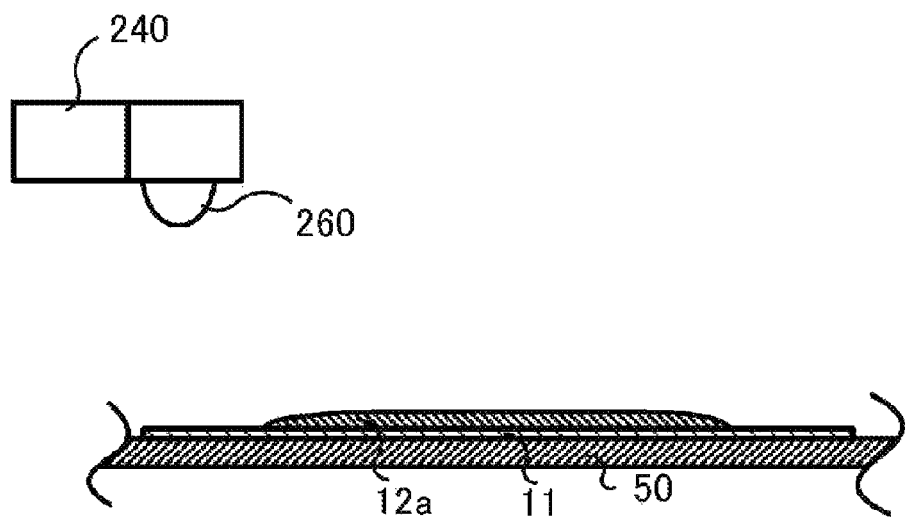

The formation of the matte layer 12a will be described with reference to FIG. 4A and FIG. 4B. When forming the matte layer 12a, the control unit 270 controls the transporting mechanism 210 and the driving mechanism 250 and relatively moves the print head 240 in the sub-scanning direction and the main scanning direction with respect to the base material 50. During the movement, the control unit 270 controls the curing unit 260 to cause the curing unit 260 (UV lamp) to emit an ultraviolet light U1 (FIG. 4A). The ultraviolet light U1 has an energy to immediately cure the UV curable ink (here, completely cure to solidify the UV curable ink). Furthermore, during the movement, the control unit 270 controls the print head 240 to eject the UV curable ink L from the nozzle at the timing when the nozzle of the print head 240 reaches the position of the pixel (specified by the image data) for ejecting the UV curable ink (FIG. 4A). The ejected UV curable ink L lands on the base material 50 (here, on the primer layer 11), and is cured by the ultraviolet light U1 from the curing unit 260 (UV lamp) after landing. A matte layer 12aa (FIG. 4A) formed by the cured UV curable ink L configures one part of the matte layer 12a. Once the ejection of the UV curable ink L and the irradiation of the ultraviolet light U1 (i.e., curing of the UV curable ink L) are finished, the matte layer 12a is completed (FIG. 4B). The matte layer 12a has the lower surface entirely attached to the primer layer 11.

Figure 5A:
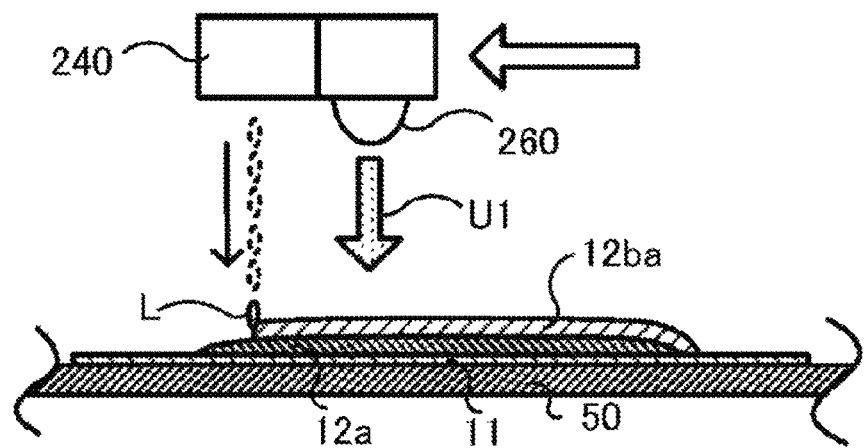
FIG. 5A and FIG. 5B illustrate a process diagram showing a process of forming a matte layer second from the bottom.
Figure 5B:
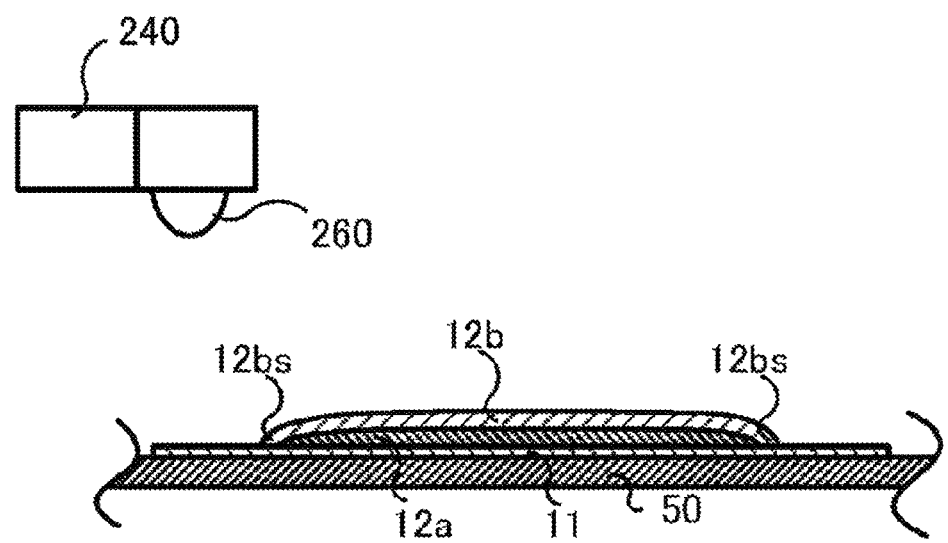

The formation of the matte layer 12b will be described with reference to FIG. 5A and FIG. 5B. When forming the matte layer 12b, the control unit 270 relatively moves the print head 240 in the sub-scanning direction and the main scanning direction with respect to the base material 50, similar to the formation of the matte layer 12a. During the movement, the control unit 270 causes the curing unit 260 (UV lamp) to emit an ultraviolet light U1 (FIG. 5A). Furthermore, the control unit 270 causes the UV curable ink L to be ejected from the nozzle at the timing when the nozzle of the print head 240 reaches the position of the pixel for ejecting the UV curable ink (FIG. 5A). The ejected UV curable ink L lands on the base material 50 (here, on the primer layer 11 or the matte layer 12a), and is cured by the ultraviolet light U1 from the curing unit 260 (UV lamp) immediately after landing. A matte layer 12ba (FIG. 5A) formed by the cured UV curable ink L configures one part of the matte layer 12b. Once the ejection of the UV curable ink L and the irradiation of the ultraviolet light U1 (i.e., curing of the UV curable ink L) are finished, the matte layer 12b is completed (FIG. 5B). The UV curable ink L that landed on the primer layer 11 becomes a peripheral edge 12bs (portion attached to the primer layer 11) of the matte layer 12b by curing.

Each of the matte layer 12c to matte layer 12i is also formed similar to the matte layers 12a, 12b.

The formation of the gloss layer 13 will be described with reference to FIG. 6A through FIG. 6D. When forming the gloss layer 13, the control unit 270 relatively moves the print head 240 in the sub-scanning direction and the main scanning direction with respect to the base material 50, similar to the formation of the matte layer 12a, and the like. During the movement, the control unit 270 causes the curing unit 260 (UV lamp) to emit an ultraviolet light U2 (FIG. 6A). The ultraviolet light U2 only has an energy to the extent of semi-curing the UV curable ink. Semi-curing means curing to an extent the UV curable ink is not completely cured to a solid, and the UV curable ink in the semi-cured state is a fluid. Furthermore, the control unit 270 causes the UV curable ink L to be ejected from the nozzle at the timing when the nozzle of the print head 240 reaches the position of the pixel (specified by the image data) for ejecting the UV curable ink (FIG. 6A). The ejected UV curable ink L lands on the base material 50 (here, on the primer layer 11 or the matte layer 12i), and is semi-cured by an ultraviolet light U2 from the curing unit 260 (UV lamp) immediately after landing. The layer 13a (FIG. 6A and FIG. 6B) formed by the semi-cured UV curable ink L is still a fluid. Once the ejection of the UV curable ink L and the irradiation of the ultraviolet light U2 (i.e., semi-curing of the UV curable ink L) are finished, the control unit 270 relatively moves the print head 240 in the sub-scanning direction and the main scanning direction with respect to the base material 50 while emitting an ultraviolet light U3 having an energy for curing (completely curing) the UV curable ink L in the semi-cured state from the curing unit 260 (UV lamp) after waiting for a predetermined period (FIG. 6C). Here, the control unit 270 relatively moves the print head 240 to irradiate the entire layer 13a with the ultraviolet light U3 and cure the entire layer 13a. The layer 13a is thereby cured, and the gloss layer 13 is completed (FIG. 6D). The UV curable ink L that landed on the primer layer 11 becomes a peripheral edge 13s (portion attached to the primer layer 11) of the gloss layer 13 by curing.

In the inkjet method, one drop of UV curable ink is ejected for every pixel and landed on the base material 50, and hence the UV curable ink immediately after landing has a dome shape raised at the center (see UV curable ink X after landing in FIG. 7). Thereafter, the UV curable ink X ((A) of FIG. 7) gradually spreads unless it is cured and becomes a solid ((B) of FIG. 7).

In the formation of the matte layers 12a to 12i, the UV curable ink is cured immediately after landing. That is, the UV curable ink is cured before spreading after landing. Thus, the surface of each of the matte layers 12a to 12i formed when the UV curable ink is cured has an irregular shape in which the dome shapes, as shown in (A) of FIG. 7, are gathered (in FIG. 1, and FIG. 3 to FIG. 6D, the irregularities are omitted). Thus, the matte layers 12a to 12i are formed by curing the UV curable ink before spreading, and thus has a thick thickness (thick even compared to the gloss layer 13).

In the formation of the gloss layer 13, on the other hand, the UV curable ink is semi-cured, and then cured. The UV curable ink in the semi-cured state gradually spreads as shown in (B) of FIG. 7. Therefore, the surface of the gloss layer 13 formed through the semi-cured state is formed smooth by the spreading of the UV curable ink in the semi-cured state period. In particular, the gloss layer 13 has a high surface smoothness compared to the matte layers 12a to 12i (no irregularities are preferred, but minor irregularities are tolerated). The surface smoothness is represented using Beck smoothness, Sheffield smoothness, and the like. Furthermore, the gloss layer 13 is thin compared to the matte layers 12a to 12i due to the spreading. The strength of the ultraviolet light U2, the irradiation time of the ultraviolet light U2, the waiting time o the control unit 270, and the like when forming the gloss layer 13 are defined to appropriate values in advance through experiments, and the like (when the spreading of the UV curable ink is fast, the waiting time may be 0 second). In the formation of the gloss layer 13, the UV curable ink in the semi-cured state spreads, and thus the shape of the gloss layer 13 in plan view is sometimes slightly more spread than the shape in plan view represented by the image data used when forming the gloss layer 13. That is, the gloss layer 13 may slightly run out from the primer layer 11.

Effects of Embodiment

In the present embodiment, a plurality of layers included in the braille body 100 are formed with the UV curable ink, and the layers other than the uppermost layer of the plurality of layers are assumed as the matte layers 12a to 12i having a thick thickness, and the uppermost layer is assumed as the gloss layer 13 having a higher surface smoothness than the matte layers 12a to 12i. Therefore, the height of the braille body 100 can be obtained by the respective thicknesses of the matte layers 12a to 12i. In particular, the height becomes higher than the braille body 100 in which all the layers are formed with the gloss layer by forming each of the matte layers 12a to 12i thicker than the gloss layer 13. Furthermore, as the uppermost layer is the gloss layer 13, the tactual sense of the braille body 100 becomes smoother than when the uppermost layer is a matte layer. Therefore, according to the embodiment, the braille body 100 having the necessary height and a smooth tactual sense while having a layered structure can be obtained.

Furthermore, when forming the gloss layer 13, the UV curable ink in the semi-cured state is cured when spread (in a state of high surface smoothness) more than when forming (when curing) the matte layers 12a to 12i, whereby the surface smoothness of the gloss layer 13 becomes higher than the matte layers 12a to 12i. Furthermore, as the matte layers 12a to 12i are formed by curing the UV curable ink immediately after being ejected, each of the layers can be formed thick. Therefore, according to the present embodiment, the braille body 100 having the necessary height and a smooth tactual sense while having a layered structure can be formed. The UV curable ink may not be in a semi-cured state and the spreading (smoothness of surface) of the UV curable ink can be waited in the state of the UV curable ink at the time of the ejection, but the speed of spreading becomes slower if the UV curable ink is semi-cured, and thus the curing timing of the UV curable ink can be easily controlled.

The braille body 100 further includes the primer layer 11 arranged between the matte layers 12a to 12i and the gloss layer 13, and the base material 50 and provided to fix the matte layers 12a to 12i and the gloss layer 13 to the base material 50. Thus, the braille body 100 can be strongly fixed to the base material 50 by the primer layer 11.

Furthermore, the primer layer 11 has a larger area than the matte layers 12a to 12i, and the primer layer 11 includes a portion running out from each of the matte layers 12a to 12i in plan view. Moreover, the matte layers 12a to 12i and the gloss layer 13 have a larger area as the layer is located higher (layered above), and cover the lower layer one below. Furthermore, the lower surface of the matte layer 12a, which is the lowermost layer, is attached to the primer layer 11, and each peripheral edge (portion running out from the lower layer one below in plan view) of the matte layers 12b to 12i and the gloss layer 13 other than the lowermost layer is attached to the upper surface of the primer layer 11. The area of each layer of the matte layers 12a to 12i and the gloss layer 13 may be the same, or the area may become smaller toward the upper layer, but a braille body of a suitable shape (dome shape with high center) is obtained if the area becomes larger toward the upper layer and covers the entire lower layer one below as in the embodiment described above. Furthermore, as each peripheral edge of the matte layers 12b to 12i and the gloss layer 13 other than the lowermost layer is attached to the primer layer 11, the braille body 100 can be more strongly fixed to the base material 50 than when only the lowermost layer is attached to the primer layer 11. The primer layer 11 having adhesiveness can be prevented from being exposed by preventing the primer layer 11 from running out from the gloss layer 13 in plan view. In at least two layers adjacent to each other in the up and down direction of the plurality of layers including the matte layers 12a to 12i and the gloss layer 13, the upper layer has a large area compared to the lower layer, the upper layer covers the lower layer, and at least one part of the peripheral edge (portion running out from the lower layer one below) of the upper layer is formed to be attached to the primer layer 11, so that the matte layers 12a to 12i and the gloss layer 13 can be strongly fixed to the base material 50.

The thickness per layer of the matte layers 12a to 12i obtained by the formation of the braille body through the inkjet method is about 0.04 mm. As there are nine matte layers 12a to 12i, and also the gloss layer 13, the height of the braille body 100 is larger than or equal to 0.36 mm. Therefore, the braille body 100 can satisfy the JIS standard and the like (e.g., 0.4 mm±0.1 mm). Furthermore, in the present embodiment, the braille body 100 is formed by the inkjet printer, and thus the braille body satisfying the JIS standard and the like can be easily formed. The number of matte layers and the number of gloss layers can be an arbitrary number as long as the JIS standard and the like are satisfied.

Alternative Embodiment

The present disclosure is not limited to the embodiment described above. Various types of modifications may be performed on the embodiment described above. The alternative embodiments will be described below.

First Alternative Embodiment

A configuration including the matte layers 12a to 12i and the gloss layer 13 has been adopted, but this configuration is not the sole case. In other words, some of the matte layers 12a to 12i may be replaced with a gloss layer formed through the method similar to the gloss layer 13. Furthermore, the matte layers 12a to 12i may be layers different from the matte layer and the gloss layer. Moreover, the number of layers of the braille body 100 may be other than the number of layers in the embodiment described above.

Second Alternative Embodiment

In the formation of the matte layers 12a to 12i, the UV curable ink ejected in the formation of the matte layers 12a to 12i may be spread (may or may not go through the semi-cured state) in a range not spread as much as the gloss layer 13 for flattening the surface to some extent. The strength of the ultraviolet light irradiated by the curing unit 260 may be adjusted, and the curing speed, the extent of semi-curing, and the like of the UV curable ink may be adjusted. Furthermore, the UV curable ink may be spread while being gradually cured by continuously being irradiated with a weak ultraviolet light.

Third Alternative Embodiment

The gloss layer 13 may be a layer that covers the entire base material 50. If the fixing strength of the braille body 100 and the base material 50 is satisfactory, the primer layer 11 may be omitted. The primer layer 11 may be arranged on the entire surface of the base material 50. In this case, the primer layer 11 is exposed at the portion not formed with the braille body 100, and thus the exposed portion may be covered with some kind of coating. Furthermore, the fixing strength of the braille body 100 and the base material 50 may be increased by performing the primer process with respect to the base material 50 in place of the primer layer 11.

Fourth Alternative Embodiment

The matte layers 12a to 12i and the gloss layer 13 may be formed with a thermosetting or thermoplastic ink (ink cured by heating or cooling) or other electromagnetic wave curable ink other than the UV curable ink (e.g., ink cured by visible light, ink cured by electron beam (EB)) as a material. When adopting the thermosetting ink, a heater, a cooling device, or the like is adopted for the curing unit 260. Furthermore, when adopting other electromagnetic wave curable ink, a lamp that emits an electromagnetic wave (e.g., visible light or electron beam) necessary for the curing of the ink, and the like are adopted for the curing unit 260. Each layer of the matte layers 12a to 12i and the gloss layer 13 may be formed with the same material or formed by a different material.

What is claimed is:

1. A braille body comprising:
   a plurality of layers that are laminated, wherein
   the plurality of layers are formed with an electromagnetic wave curable ink, a thermosetting ink, or a thermoplastic ink,
   among the plurality of layers, one or more layers other than an uppermost layer touched by a human are a matte layer, and
   at least the uppermost layer is a gloss layer having a higher surface smoothness than the matte layer.

2. The braille body according to claim 1, further comprising:
   a primer layer disposed between the plurality of layers and a base material to fix the plurality of layers to the base material.

3. The braille body according to claim 2,
   wherein the plurality of layers include a first layer, and a second layer, which is a layer located lower than the first layer, and
   the first layer covers the second layer, and at least one part of a peripheral edge of the first layer is attached to the primer layer.

4. The braille body according to claim 2, wherein
   in the plurality of layers, an area in plan view becomes larger toward a layer located higher, each upper layer covering a lower layer below,
   the primer layer has a larger area in plan view than each of the lower layers, and
   a peripheral edge of each upper layer is attached to an upper surface of the primer layer.

5. The braille body according to claim 1, wherein the plurality of layers are formed by an inkjet type printing.

6. An inkjet printer for forming a braille body including a plurality of layers, the inkjet printer comprising:
   a print head that ejects an ink, wherein the ink is an electromagnetic wave curable ink, a thermosetting ink, or a thermoplastic ink;
   a curing unit that cures the ink ejected from the print head; and
   a controller that drives the print head and the curing unit, wherein
   the controller carries out
   a first process of driving the print head to eject the ink, and driving the curing unit to cure the ink ejected from the print head, and
   a second process of driving the print head to eject the ink, and driving the curing unit to cure the ink ejected from the print head in a state where a surface smoothness of the ink is higher than in the curing of the first process, and
   among the plurality of layers, one or more layers other than an uppermost layer touched by a human are formed through the first process, and at least the uppermost layer is formed through the second process.

7. The inkjet printer according to claim 6, further comprising:

a primer layer forming portion that forms a primer layer on a base material, wherein the primer layer is for fixing the plurality of layers to the base material, wherein the controller further carries out a third process of driving the primer layer forming portion to form the primer layer, the first process and the second process are carried out after the third process so that an area in plan view becomes larger toward a layer located higher in the plurality of layers, and each upper layer covers a lower layer below, the primer layer has a larger area in plan view than each of the lower layers, and a peripheral edge of each upper layer in the plurality of layers is attached to an upper surface of the primer layer.

8. A braille body forming method of forming a braille body including a plurality of layers on a base material, the braille body forming method comprising steps of carrying out a first process of ejecting an ink through an inkjet method, and curing the ejected ink, wherein the ink is an electromagnetic wave curable ink, a thermosetting ink, or a thermoplastic ink, and a second process of ejecting the ink through the inkjet method, and curing the ejected ink in a state where a surface smoothness of the ink is higher than in the curing of the first process, and among the plurality of layers, one or more layers other than an uppermost layer touched by a human are formed through the first process, and at least the uppermost layer is formed through the second process.

9. The braille body forming method according to claim 8, further comprising:

a step of carrying out a third process of forming a primer layer on a base material, wherein the primer layer is for fixing the plurality of layers to the base material before the first process and the second process, wherein the first process and the second process are carried out so that an area in plan view becomes larger toward a layer located higher in the plurality of layers, and each upper layer covers a lower layer below, the primer layer has a larger area in plan view than each of the lower layers, and a peripheral edge of each upper layer in the plurality of layers is attached to an upper surface of the primer layer.

* * * * *